(12) United States Patent
Kloiber et al.

(10) Patent No.: US 10,363,678 B2
(45) Date of Patent: Jul. 30, 2019

(54) SAW GUIDE AND METHOD OF USING SAME

(71) Applicant: TECHSOUTH, INC., Matthews, NC (US)

(72) Inventors: William D. Kloiber, Charlotte, NC (US); Richard Brodrick, Charlotte, NC (US)

(73) Assignee: TECHSOUTH, INC., Indian Trail, NC (US)

( * ) Notice: Subject to any disclaimer, the term of this patent is extended or adjusted under 35 U.S.C. 154(b) by 163 days.

(21) Appl. No.: 15/394,270

(22) Filed: Dec. 29, 2016

(65) Prior Publication Data
US 2017/0106554 A1 Apr. 20, 2017

Related U.S. Application Data

(63) Continuation of application No. 14/047,057, filed on Oct. 7, 2013, now Pat. No. 9,566,718.

(51) Int. Cl.
*B26D 7/00* (2006.01)
*B23D 51/02* (2006.01)
*B23D 55/08* (2006.01)

(52) U.S. Cl.
CPC ......... *B26D 7/0006* (2013.01); *B23D 51/025* (2013.01); *B23D 55/082* (2013.01); *Y10T 83/8889* (2015.04)

(58) Field of Classification Search
CPC .... B23D 51/00; B23D 51/025; B23D 55/082; B26D 7/00; B26D 7/0006; Y10T 83/6945; Y10T 83/695

USPC .................................................. 83/761–762
See application file for complete search history.

(56) References Cited

U.S. PATENT DOCUMENTS

| | | | | | |
|---|---|---|---|---|---|
| 4,078,304 A | * | 3/1978 | Netzel | ..................... | B23D 21/08 30/101 |
| 4,494,434 A | * | 1/1985 | Young | ..................... | B23Q 9/005 33/479 |
| 4,903,609 A | * | 2/1990 | Isakov | ..................... | E01B 27/16 104/10 |
| 5,499,578 A | * | 3/1996 | Payne | ..................... | A47J 43/18 30/114 |
| 5,718,158 A | * | 2/1998 | Rogge | ..................... | A21C 15/04 269/295 |
| 5,832,977 A | * | 11/1998 | Hampton | ............. | B23Q 9/0014 144/144.51 |
| 5,927,701 A | * | 7/1999 | Chapman | ................. | B26D 3/30 269/295 |

(Continued)

*Primary Examiner* — Jason Daniel Prone
*Assistant Examiner* — Richard D Crosby, Jr.
(74) *Attorney, Agent, or Firm* — Ashley Law Firm P.C.; Stephen S. Ashley, Jr.

(57) ABSTRACT

A saw guide can include pivotally connected arcuate sections having a plurality of slots formed therein to receive and guide saw blades as they cut a workpiece, such as a pipe or tube. The slots are of varying width so that the saw guide can be used with different saws. For example, the saw guide can include a first slot sized to receive and guide the blade of a reciprocating saw, and a relatively narrower second slot, sized to receive the blade of a portable band saw. The saw guide can include a locking mechanism to securely hold the saw guide on the workpiece, and a stopping mechanism for preventing the saw blade from cutting into the saw guide.

14 Claims, 6 Drawing Sheets

(56) References Cited

U.S. PATENT DOCUMENTS

| | | | | |
|---|---|---|---|---|
| 8,678,366 B2* | 3/2014 | Bowers | ............... | B25H 1/08 |
| | | | | 269/289 R |
| 8,800,158 B1* | 8/2014 | Shim | ............. | A61B 17/1635 |
| | | | | 33/630 |
| 9,925,679 B2* | 3/2018 | Slutsky | ............. | B26B 29/063 |
| D823,048 S * | 7/2018 | Phillips-Solomon | ......... | D7/381 |
| 10,059,018 B2* | 8/2018 | Zhou | ............... | B26B 25/005 |
| 2004/0204731 A1* | 10/2004 | Gant | ............... | B27B 5/32 |
| | | | | 606/170 |
| 2015/0096420 A1* | 4/2015 | Kloiber | ............ | B23D 51/025 |
| | | | | 83/829 |

* cited by examiner

SAW GUIDE AND METHOD OF USING SAME

CROSS REFERENCE TO RELATED APPLICATIONS

This application is a continuation of U.S. patent application Ser. No. 14/047,057, filed Oct. 7, 2013, now U.S. Pat. No. 9,566,718, and which is incorporated herein by reference.

TECHNICAL FIELD AND BACKGROUND OF INVENTION

The present invention relates to a saw guide. One embodiment of the invention comprises a saw guide having a plurality of slots of varying width to receive and guide saw blades of varying size.

Saw guides are known in the art. Typically such devices are used to guide a saw blade as it cuts a workpiece so that the workpiece has a clean and even edge when the cut is complete.

There are a variety of saws having blades of various size and thickness. For example, reciprocating saws typically have blades that are significantly thicker than portable band saws. Reciprocating saws and portable band saws are often used to saw metal piping and tubing, and it is common to use a saw guide when cutting a pipe or tube with a portable band saw or reciprocating saw. However, because of the difference in thickness of the blades of the reciprocating and portable band saws, saw guides constructed for use with a reciprocating saw typically cannot be used with a portable band saw and vice versa.

SUMMARY OF INVENTION

Therefore, one object of the present invention is to provide a saw guide that can accommodate blades of varying thickness, without the use of additional tools and/or structural modification of the saw guide. These and other objects of the present invention can be achieved in various embodiments of the invention described herein.

One embodiment of the invention comprises an apparatus for guiding saw blades comprising a body adapted for positioning on a workpiece to be cut with a saw blade; and first and second slots formed in the body for receiving saw blades therein. The first slot is wider than the second slot so that the first and second slots can receive at least two saw blades of varying width.

According to another embodiment of the invention, the first slot is adapted for receiving the blade of a reciprocating saw.

According to another embodiment of the invention, the first slot has a width of 0.062 inches.

According to another embodiment of the invention, the second slot is adapted for receiving a blade of a portable band saw.

According to another embodiment of the invention, the second slot has a width of 0.040 inches.

According to another embodiment of the invention, the body has first and second arcuate members, and each of the first and second members have first and second ends. The first end of the first arcuate member is releasably attached to the first end of the second arcuate member, and the second end of the first section is pivotally connected to the second end of the second member. As such, the body is moveable between a closed position in which the first ends of the first and second arcuate members are attached, and an open position in which the first ends of the first and second arcuate members are released from attachment and the first and second sections can freely pivot.

According to another embodiment of the invention, the body is substantially cylindrical when in the closed position, and the workpiece to be cut by the saw guide is substantially cylindrical.

According to another embodiment of the invention, the first and second arcuate sections are semi-cylindrical.

According to another embodiment of the invention, the second ends of the first and second arcuate members are pivotally connected by at least one hinge attached to the second ends of the first and second sections.

According to another embodiment of the invention, the saw guide includes a locking means for releasably locking the first ends of the first and second arcuate members together.

According to another embodiment of the invention, a first substantially U-shaped channel is formed at the first end of the first arcuate member and a second substantially U-shaped channel is formed at the first end of the second arcuate section. Each U-shaped channel has an outer edge and an inner edge. The inner edge of the first channel communicates with the inner edge of the second channel when the arcuate members are in the closed position. A set screw is pivotally connected to the first channel and extends from the first channel into the second channel and beyond the outer edge of the second channel. A wing nut is threadingly engaged on the portion of the set screw extending beyond the outer edge of the second channel. The wing nut can be tightened against the outer edge of the second channel to lock the first ends of the first and second arcuate members together.

According to another embodiment of the invention, a first stopping member is positioned in the first actuate member and a second stopping member is positioned in the second arcuate member. The stopping members prevent a saw blade from advancing in the body beyond the first and second slots.

According to another embodiment of the invention, the first stopping member comprises a first roll pin, and the second stopping member comprises a second roll pin. Set screws retain the roll pins within body of the saw guide.

According to another embodiment of the invention, a saw guide comprises a body adapted for positioning on a substantially cylindrical workpiece to be cut with a saw blade. At least one slot is formed in the body for receiving a saw blade therein and guiding the saw blade while cutting the workpiece, and at least one stopping member is positioned in the body to stop the saw blade from advancing in the body beyond the slot and penetrating the body.

According to another embodiment of the invention, a roll pin is positioned within an aperture formed within the body and held within the aperture by a set screw threadingly engaged to an inner surface of the aperture.

According to another embodiment of the invention, the saw guide includes a first slot sized to receive the blade of a reciprocating saw, and a second slot sized to receive the blade of a portable band saw.

According to another embodiment of the invention, a saw guide comprises a substantially cylindrical body for positioning on a substantially cylindrical workpiece to be cut with a saw blade. The body is comprised of first and second arcuate members, and each of the first and second arcuate members has first and second ends. The first end of the first arcuate member is releasably attached to the first end of the second arcuate member, and the second end of the first member is pivotally connected to the second end of the second member. The body is moveable between a closed position in which the first ends of the first and second arcuate members are attached, and an open position in which the first ends of the first and second arcuate members are released from attachment, and the first and second members can freely pivot. At least one slot is formed in the body for receiving a saw blade therein, and guiding the saw blade while cutting the workpiece. A first substantially U-shaped channel is formed at the first end of the first arcuate member and a second substantially U-shaped channel is formed at the first end of the second arcuate member. Each U-shaped channel has an outer edge and an inner edge, and the inner edge of the first channel communicates with the inner edge of the second channel when the arcuate members are in the closed position. A set screw is pivotally connected to the first channel and extends from the first channel into the second channel and beyond the outer edge of the second channel. A wing nut is threadingly engaged on the portion of the set screw that extends beyond the outer edge of the second channel. The wing nut is tightened against the outer edge of the second channel to lock the first ends of the first and second arcuate members together.

DETAILED DESCRIPTION OF PREFERRED EMBODIMENTS OF INVENTION

Figure 1:
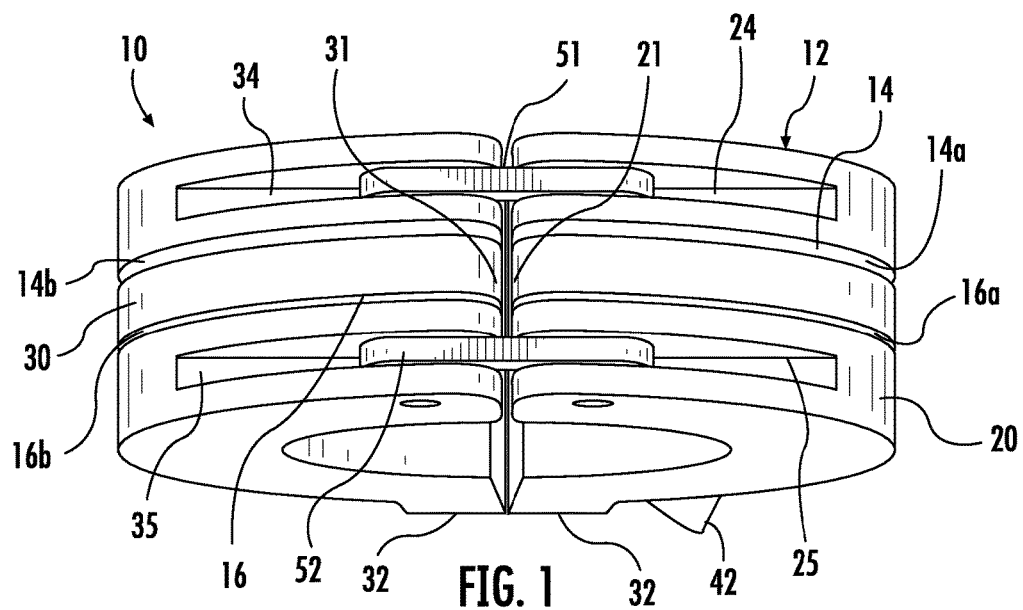
FIG. 1 is a top perspective view of a saw guide according to a preferred embodiment of the invention.

A saw guide according to a preferred embodiment of the invention is illustrated in FIGS. 1-9, and shown generally at reference numeral 10. As shown in FIG. 1, the saw guide 10 comprises a substantially cylindrical body 12, and saw slots 14, 16 formed in the body 12.

Figure 2:
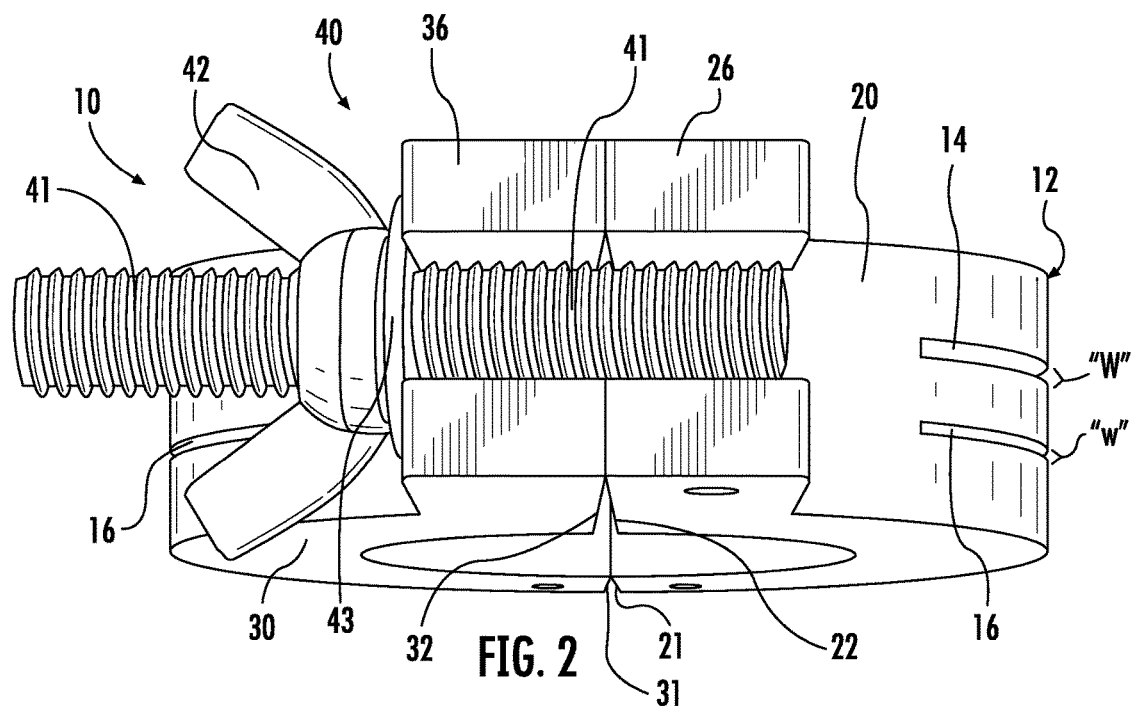
FIG. 2 is a bottom perspective view of the saw guide of FIG. 1.
Figure 3:
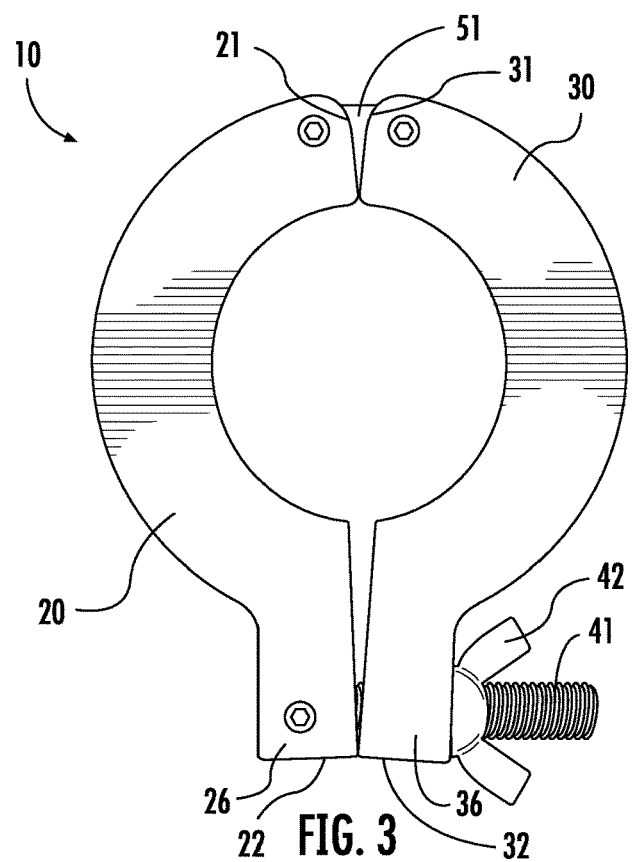
FIG. 3 is an elevational view of the saw guide of FIG. 1.
Figure 4:
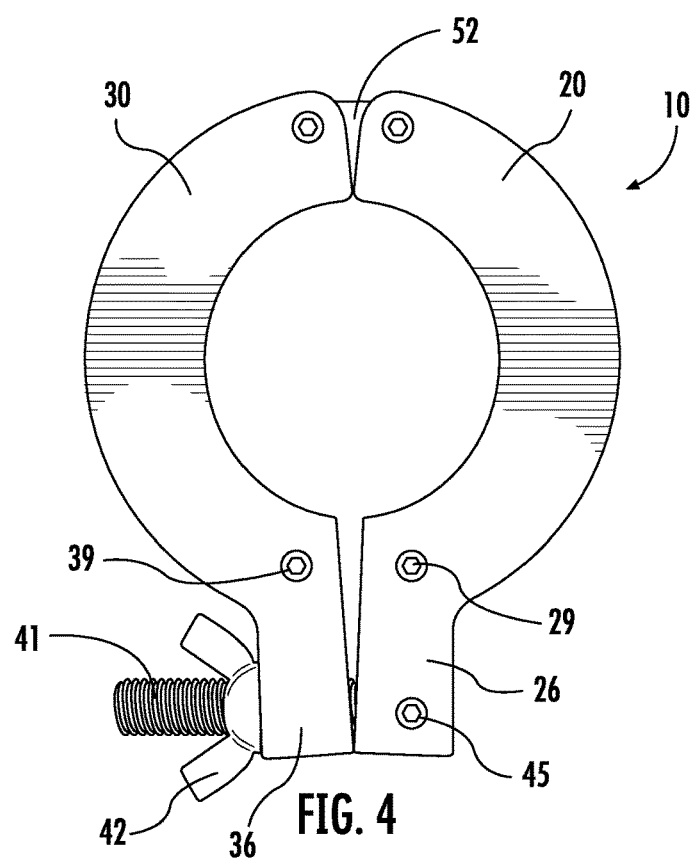
FIG. 4 is another elevational view of the saw guide of FIG. 1.
Figure 5:
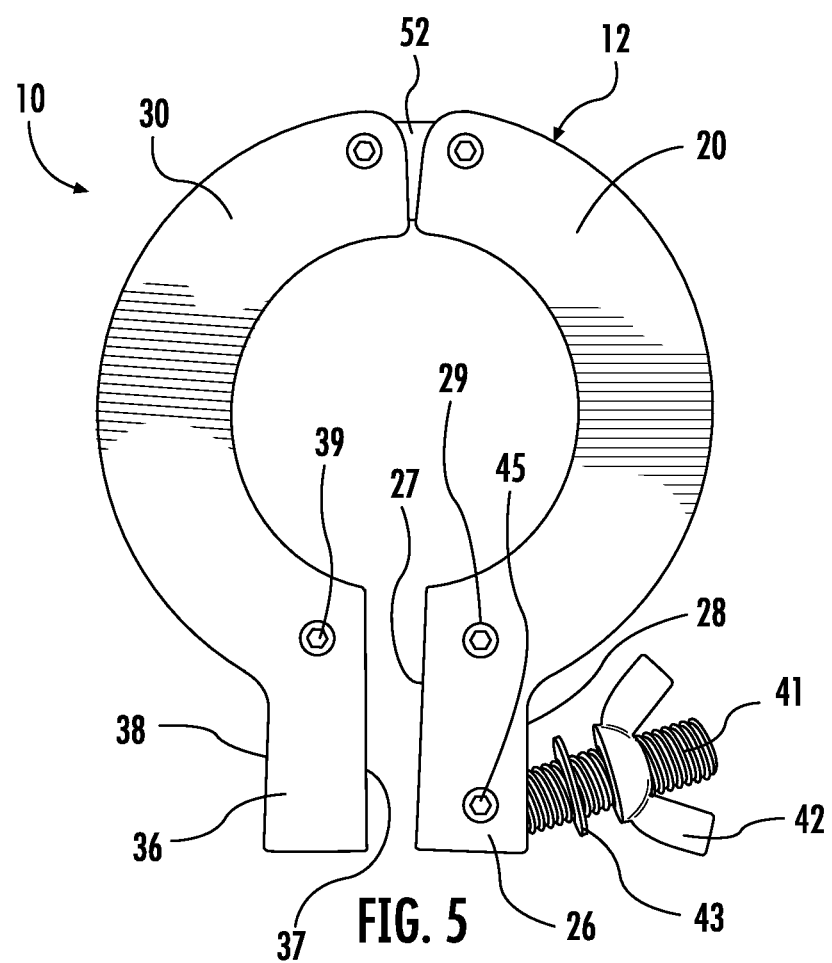
FIG. 5 is another elevational view of the saw guide of FIG. 1.

As shown in FIGS. 1-3, the saw guide body 12 comprises first and second arcuate members 20, 30 having upper ends 21, 31 and lower ends 22, 32, respectively. The arcuate members 20, 30 can be substantially semi-cylindrical as shown in FIGS. 3-5. The arcuate members 20, 30 are releasably joined at the upper ends 21, 31 by a locking mechanism 40, and pivotally connected at the lower ends 22, 32. The arcuate members 20, 30 can be pivotally connected by a pair of hinges 51, 52 positioned within grooves 24, 25, formed in the first arcuate member 21 and corresponding grooves 34, 35 formed in the second arcuate member 30, as shown in FIG. 1. As such, the arcuate members 20, 30 can pivot about the hinges 51, 52, thereby allowing the saw guide body 12 to move from a closed position, shown in FIGS. 2-4, to a fully open position shown in FIG. 6.

Figure 6:
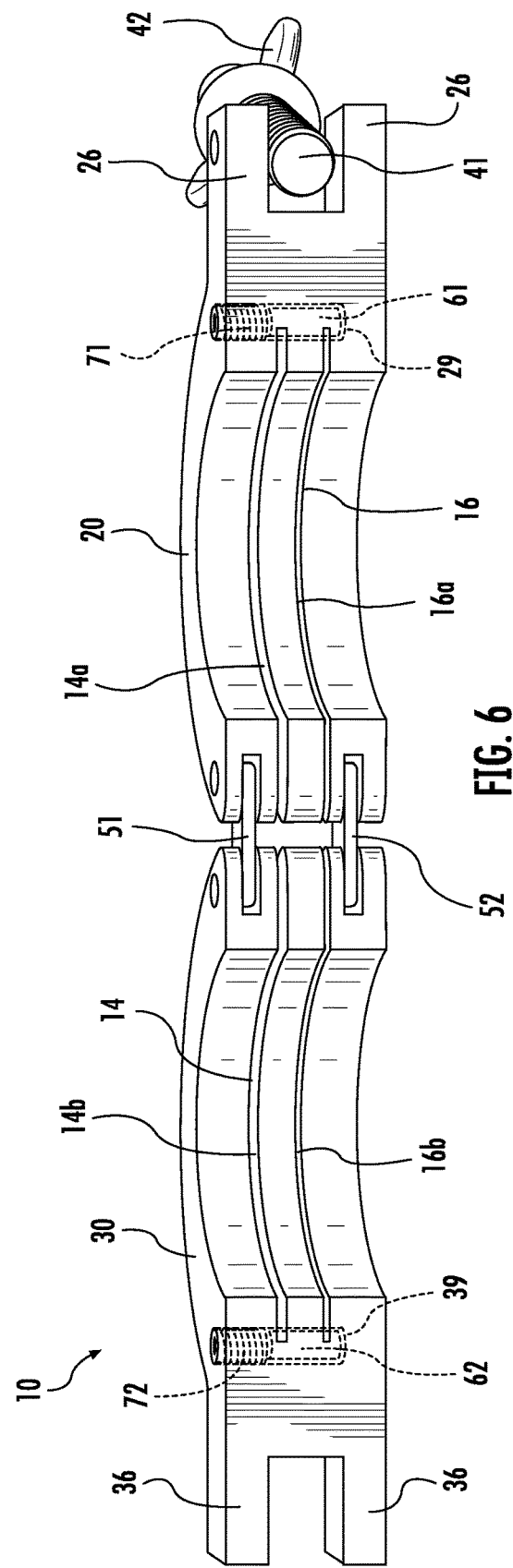
FIG. 6 is another perspective view of the saw guide of FIG. 1.

As shown in FIGS. 2-6, a first locking section 26 is formed on the first arcuate member 20 proximate the upper end 21, and a corresponding second locking section 36 is formed on the second arcuate section 30 proximate the upper end 31 of the second arcuate member 30. Each locking section 26, 36 is comprised of a substantially U-shaped channel, as shown in FIGS. 2 and 6. The locking sections 26, 36 have inner edges 27, 37 and outer edges, 28, 38, respectively, as shown in FIG. 5. The inner edges 27, 37 face each other when the saw guide body 12 is closed, as shown in FIGS. 2-4, and the U-shaped channels of the locking sections 26, 36 are aligned with each other. As such, the U-shaped channels are in communication with each other and provide a single continuous U-shaped channel when the saw guide body 12 is in the closed position.

Figure 7:
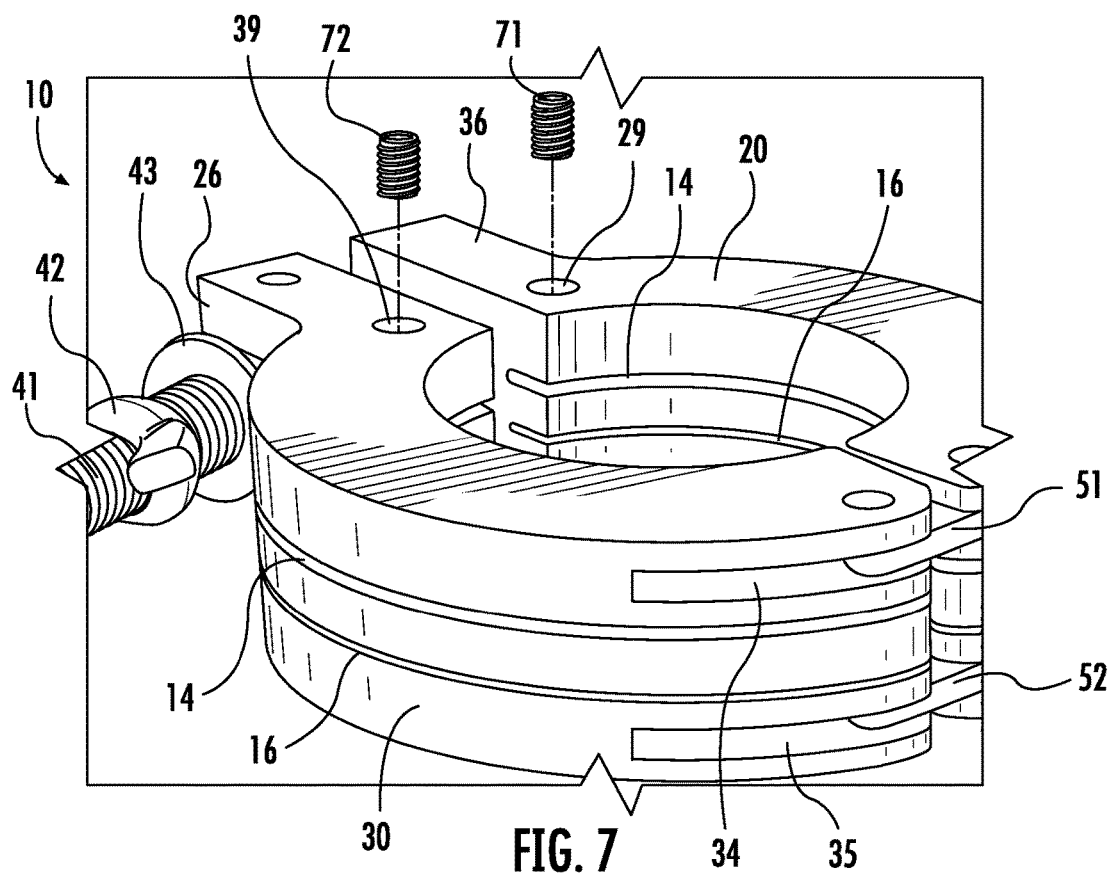
FIG. 7 is a partial perspective view of the saw guide of FIG. 1.

The locking mechanism 40 can comprise a set screw 41 pivotally connected to the first locking section 26, as shown in FIGS. 4 and 5. The set screw 41 can be pivotally connected by way of a pivot pin 45 extending through an aperture in the set screw 41 and into an aperture in the first locking section 26. When in the closed position, the set screw 41 extends through the first and second locking sections 26, 36 and extends beyond the outer edge 38 of the second locking section 36, as shown in FIG. 2. A wing nut 42 is threadingly engaged on the portion of the set screw 41 extending beyond the outer edge of the second locking section 36. The wing nut 42 can be tightened against the outer edge 38 of the second locking section 36 to lock the first and second arcuate members 20, 30 together. A washer 43 can be positioned on the set screw 41, as shown in FIGS. 5 and 7, to protect the wingnut 42. If desired, the set screw 41 and wingnut 42 can be removed from the saw guide 10 by removing the pivot pin 45, and the saw guide 10 can be locked in the closed position using other locking means, such as a clamp positioned on the locking sections 26, 36.

The saw slots 14, 16 comprise a reciprocating saw slot 14 and a portable band saw slot 16. The reciprocating saw slot 14 has a greater width "W" than the width "w" of the portable band saw slot 16, as shown in FIG. 2. The slots 14, 16 extend completely through the arcuate members 20, 30 until terminating proximate the lower ends 21, 31 and locking sections 26, 36, as shown in FIGS. 2 and 6.

The reciprocating saw slot 14 is comprised of a first slot section 14a formed in the first arcuate member 20, and a corresponding second slot section 14b formed in the second arcuate member 30. The two slot sections 14a, 14b are aligned with each other effectively forming a single slot 14 when in the closed position, as shown in Figure. The saw slot 14 is particularly sized to receive the blade of a reciprocating saw, such as the saw sold under the name SAWZALL by Milwaukee Electric Tool Corporation. The saw slot 14 has a width "W" of 0.062 inches.

Figure 9:
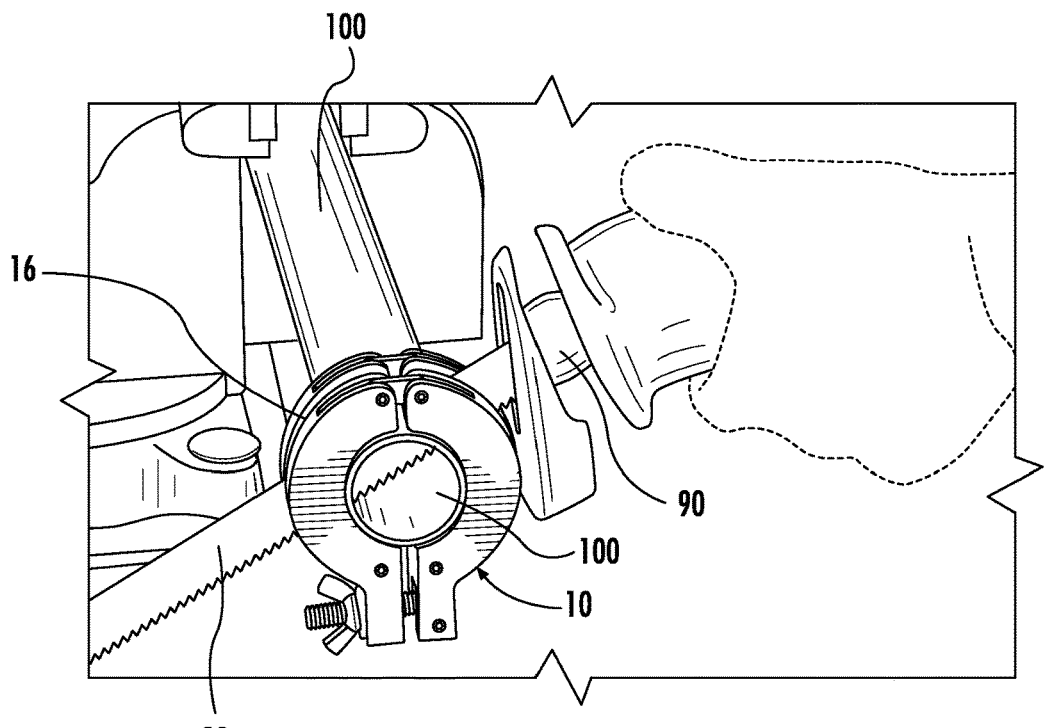
FIG. 9 is another environmental perspective view of the saw guide of FIG. 1.

The portable band slot 16 comprises a first slot section 16a formed in the first arcuate member 20, and a corresponding second slot section 16b formed in the second arcuate member 30. The two slot sections 16a, 16b are aligned with each other functionally forming a single slot 16 when in the closed position, as shown in FIGS. 1 and 9. The saw slot 16 is particularly sized to receive the blade of a portable band saw, such as the saw sold under the name PORTA-BAND by DEWALT Power Tools and Accessories. The saw slot 16 has a width "w" of 0.040 inches.

The saw guide 10 can include a stopping member feature to prevent a saw blade from extending past the slots 14, 16 and cutting into the saw guide body 12. As shown in FIG. 6, a pair of stopping members, such as roll pins 61, 62 can be positioned in round apertures 29, 39 formed in the arcuate sections 20, 30, respectively. The upper portion of the inner surface of each aperture 29, 39 can have female threads. The roll pins are positioned at the bottom of the apertures 29, 39, and male threaded set screws 71, 72 are screwed into the apertures 29, 39 above the roll pins 61, 62, respectively, keeping the roll pins 61, 62 in place. A saw blade moving past the lower most portion of either slot 14 or slot 16 contacts the roll pins 61, 62 preventing further movement of the saw blade. Upon contact with a saw blade, the roll pins 61, 62 spin so as not to destroy the cutting edge and/or the saw blade. The set screws 71, 72 hold the roll pins 61, 62 in place. The set screws 71, 72 do not lock the pins 61, 62 in a rigid state, but rather allow the pins 61, 62 to spin within the apertures 29, 39. When desired, the set screws 71, 72 can be unscrewed, and the set screws 71, 72 and roll pins 61, 62 can removed from the apertures 29, 39.

Figure 8:
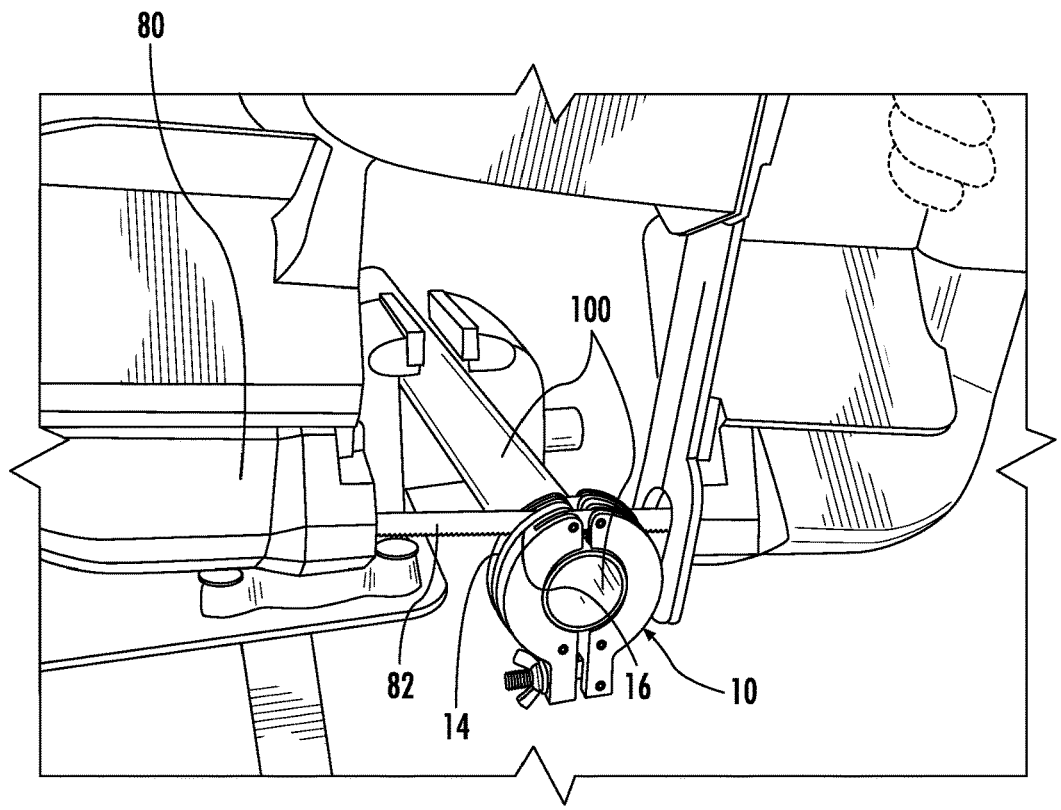
FIG. 8 is an environmental perspective view of the saw guide of FIG. 1.

Methods of using the saw guide 10 according to a preferred embodiment of the invention are illustrated in FIGS. 8 and 9. The saw guide 10 can be unlocked by rotating the wingnut 43 counterclockwise on the set screw 41 and pivoting the set screw out of the U-shaped channel of the second locking section 36, as shown in FIG. 5. The arcuate sections 20, 30 are moved to the fully open position, shown in FIG. 6. The saw guide 10 is positioned over a workpiece 100 that is to be cut with a saw blade. The workpiece 100 can be a metal tube, pipe or any other substantially cylindrical object to be cut with a saw. The saw guide 10 is positioned on the workpiece 100 at the location where it is desired to cut the workpiece. The arcuate sections 20, 30 are closed together again, and the saw guide 10 is locked in the closed position, shown in FIGS. 3 and 4, by rotating the set screw 41 into the U-shaped channel of the second locking section 36 and turning the wingnut 42 clockwise on the set screw 41 to tighten engagement of the wingnut 42 against the washer 43 and the outer surface 28 of the first locking section 26. As such, the locking mechanism 40 enables the saw guide 10 to be positioned securely on the workpiece without the use of additional tools. In addition, the locking mechanism 40 and hinges 51, 52 allow for variances in diameter of the workpiece 100.

The user selects a particular saw to use on the workpiece 100. The user can select between a reciprocating saw or portable band saw. If a reciprocating saw is selected, the blade 82 of a reciprocating saw 80 is positioned in the reciprocating saw slot 14, as shown in FIG. 8. The blade 82 is activated and moved downward onto the workpiece 100. The slot 14 maintains the blade 82 in a substantially straight vertical alignment as the blade 82 cuts through the workpiece 100, resulting in a clean, even edge to the cut workpiece 100. If the blade 82 moves past the lower most portion of the slot 14, the blade 82 contacts the roll pins 61, 62, causing the pins 61, 62 to rotate, which results in vibration of the saw guide 10. The vibration of the saw guide 10 alerts the user to stop further progression of the blade 82, thereby preventing the blade 82 from penetrating into the locking sections 26, 36 of the saw guide 10 and damaging the saw guide 10. After sawing of the workpiece 100 is completed, the saw guide 10 can be unlocked again by turning the wingnut 42 counterclockwise on the set screw 41 and rotating the set screw 41 out of the second locking section 36. The saw guide 10 can be removed from the workpiece 100.

Alternatively, if the user elects to use a portable band saw on the workpiece 100, the blade 92 of a portable band saw 90 is positioned in the portable band saw slot 16, as shown in FIG. 9. The portable band saw 90 is activated and the blade 92 is moved downward onto the workpiece 100. The slot 16 maintains the blade 92 in substantially straight vertical alignment as the blade 92 cuts through the workpiece 100, resulting in a clean, even edge to the cut workpiece 100. If the blade 92 moves past the lower most portion of the slot 16, the blade 92 contacts the roll pins 61, 62, causing the pins 61, 62 to rotate, which results in vibration of the saw guide 10. Vibration of the saw guide 10 alerts the user to stop further progression of the blade 92, thereby preventing the blade 92 from penetrating into the locking sections 26, 36 of the saw guide 10 and damaging the saw guide 10. After sawing of the workpiece 100 is completed, the saw guide 10 can be unlocked again by turning the wingnut 42 counterclockwise on the set screw 41 and rotating the set screw 41 out of the second locking section 36. The saw guide 10 can be removed from the workpiece 100.

The saw guide 10 provides a single apparatus that can be used to guide blades of both portable band saws and reciprocating saws. No tools or structural adjustments to the saw guide 10 are required to change from a portable band saw to a reciprocating saw or vice versa.

The body 12 can be nickle or zinc plated, and should be made of a material harder than the typical blades of portable band saws and reciprocating saws. The body 12 of the saw guide 10 can be made in various sizes for use on workpieces of various size. For example, the saw guide 10 can be sized for tubes or pipes having diameters of ½ inch, ¼ inch, one inch, one and one-half inches, two inches, two and a half inches, three inches, four inches, six inches and eight inches, among other sizes.

It should be noted that while the saw guide 10, which is one particular embodiment of the invention, is described above as being adapted for use with blades of portable band saws and reciprocating saws, the invention is not so limited. For example, saw guides according to the invention can be used with various saw blades other than portable band saws and reciprocating saws. In addition, the invention is not limited to a saw guide having only two slots of varying width to accommodate varying width blades. Alternative embodiments of the invention include saw guides having three or more slots of varying width to receive three or more different saw blades.

A saw guide and a method of using same are described above. Various changes can be made to the invention without departing from its scope. The above description of embodiments of the invention are provided for the purpose of illustration only and not limitation—the invention being defined by the following claims and equivalents thereof.

What is claimed is:
1. A saw guide comprising:
(a) a substantially cylindrical body for positioning on a substantially cylindrical workpiece to be cut with a saw blade, the body comprising first and second arcuate members, each of the first and second arcuate members defining a length and a width and having first and second ends, the first end of the first arcuate member releasably attached to the first end of the second arcuate member, and the second end of the first arcuate member pivotally connected to the second end of the second arcuate member, whereby the body is moveable between a closed position wherein the first ends of the first and second arcuate members are attached, and an open position wherein the first ends of the first and second arcuate sections are released from attachment and the first and second sections are allowed to freely pivot;
(b) first and second slot sections integrally formed in the first arcuate member and extending entirely through the width of the first arcuate member, the first slot section substantially parallel to the second slot section;
(c) first and second slot sections integrally formed in the second arcuate member and extending entirely through the width of the second arcuate member, the first slot section substantially parallel to the second slot section; and
(d) wherein the first slot section of the first arcuate member is linearly aligned with the first slot section of the second arcuate member to form a substantially continuous first slot for receiving a saw blade when the body is in the closed position, and the second slot section of the first arcuate member is linearly aligned with the second slot section of the second arcuate member to form a substantially continuous second slot for receiving a saw blade when the body is in the closed position, wherein the first slot is wider than the second slot whereby the first slot is adapted for receiving a first saw blade having a first width and the second slot is adapted for receiving a second saw blade having a second width less than the first width of the first saw blade.

2. The saw guide according to claim 1, wherein the first saw blade comprises a reciprocating saw blade.

3. The saw guide according to claim 2, wherein the first slot has a width of 0.062 inches.

4. The saw guide according to claim 1, wherein the second saw blade comprises a portable band saw.

5. The saw guide according to claim 4, wherein the second slot has a width of 0.040 inches.

6. The saw guide according to claim 1, wherein each of the first and second arcuate members are semi-cylindrical.

7. The saw guide according to claim 1, wherein the second ends of the first and second arcuate members are pivotally connected by at least one hinge attached to the second ends of the first and second arcuate members.

8. The saw guide according to claim 1, further comprising locking means for releasably locking the first ends of the first and second arcuate members together.

9. The saw guide according to claim 1, further comprising a first substantially U-shaped channel formed at the first end of the first arcuate member and a second substantially U-shaped channel formed at the first end of the second arcuate member, each U-shaped channel having an outer edge and an inner edge, the inner edge of the first channel in communication with the inner edge of the second channel when the first and second arcuate members are in the closed position, and further comprising a threaded member pivotally connected to the first channel and extending from the first channel into the second channel and beyond the outer edge of the second channel, and a wing nut threadingly engaged on a portion of the threaded member extending beyond the outer edge of the second channel wherein the wing nut is tightened against the outer edge of the second channel to lock the first ends of the first and second arcuate members together.

10. The saw guide according to claim 1, wherein the first saw blade comprises a reciprocating saw blade, and the second saw blade comprises a portable band saw blade.

11. The saw guide according to claim 10, wherein the first slot has a width of 0.062 inches, and the second slot has a width of 0.040 inches.

12. The saw guide according to claim 10, wherein the second end of the first arcuate member and the second end of the second arcuate members are pivotally connected by at least one hinge attached to the first and second arcuate members and extending substantially parallel to the first and second slots, and the first and second slots extend entirely through the second end of the first actuate member and the second end of the second arcuate member.

13. A method of using a saw guide comprising:
(a) providing a saw guide comprising:
(i) a substantially cylindrical body comprising first and second arcuate members, each of the first and second arcuate members defining a length and a width and having first and second ends, the first end of the first arcuate member releasably attached to the first end of the second arcuate member, and the second end of the first arcuate member pivotally connected to the second end of the second arcuate member, whereby the body is moveable between a closed position wherein the first ends of the first and second arcuate members are attached, and an open position wherein the first ends of the first and second arcuate sections are released from attachment and the first and second sections are allowed to freely pivot,
(ii) first and second slot sections integrally formed in the first arcuate member and extending entirely through the width of the first arcuate member, the first slot section substantially parallel to the second slot section,
(iii) first and second slot sections integrally formed in the second arcuate member and extending entirely through the width of the second arcuate member, the first slot section substantially parallel to the second slot section, and
(iv) wherein the first slot section of the first arcuate member is linearly aligned with the first slot section of the second arcuate member to farm a substantially continuous first slot for receiving a saw blade when the body is in the closed position, and the second slot section of the first arcuate member is linearly aligned with the second slot section of the second arcuate member to form a substantially continuous second slot for receiving a saw blade when the body is in the closed position, wherein the first slot is wider than the second slot, whereby the first slot is adapted for receiving a first saw blade having a first width and the second slot is adapted for receiving a second saw blade having a second width less than the first width of the first saw blade;
(b) positioning the substantially cylindrical body on a substantially cylindrical workpiece to be cut with a saw blade; and
(c) positioning a reciprocating saw blade within the first slot or positioning a portable band saw blade within the second slot.

14. The method according to claim 13, wherein the first slot has a width of 0.062 inches, and the second slot has a width of 0.040 inches.

* * * * *